United States Patent
Vestrand

(10) Patent No.: US 8,833,779 B1
(45) Date of Patent: Sep. 16, 2014

(54) TORSION AXLE ASSEMBLY WITH CONNECTION NODE COMPONENT

(71) Applicant: GM Global Technology Operations LLC, Detroit, MI (US)

(72) Inventor: David S. Vestrand, Oakland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/853,098

(22) Filed: Mar. 29, 2013

(51) Int. Cl.
  *B60G 3/12* (2006.01)
  *B60G 9/02* (2006.01)
  *B60G 21/05* (2006.01)
  *B60G 1/00* (2006.01)

(52) U.S. Cl.
  CPC ........................................ *B60G 1/00* (2013.01)
  USPC ....... 280/124.116; 280/124.128; 280/124.166

(58) Field of Classification Search
  CPC ...... B60G 9/003; B60G 11/20; B60G 21/051; B60G 21/052; B60G 2200/21; B60G 2200/22; B60G 2200/31; B60G 2204/1224; B60G 2204/1226; B60G 2204/148; B60G 2204/1484; B60G 2204/149; B60G 2204/4306; B60G 2204/4307; B60G 2206/20; B60G 2206/203
  USPC ................... 267/273; 280/124.116, 124.128, 280/124.131, 124.153, 124.166, 124.167, 280/93.512
  See application file for complete search history.

(56) References Cited

U.S. PATENT DOCUMENTS

| 4,830,396 | A * | 5/1989 | Gandiglio | 280/124.109 |
| 5,129,672 | A * | 7/1992 | Hiromoto et al. | 280/124.106 |
| 6,702,308 | B2 * | 3/2004 | Yamaguchi | 280/124.166 |
| 7,229,087 | B2 * | 6/2007 | Nicolas | 280/124.13 |
| 7,520,516 | B2 * | 4/2009 | Murata | 280/124.128 |
| 7,556,272 | B2 | 7/2009 | Marchel | |
| 7,967,308 | B2 * | 6/2011 | Toepker | 280/124.106 |
| 8,475,075 | B2 * | 7/2013 | Toepker | 403/271 |
| 2007/0069496 | A1 * | 3/2007 | Rinehart et al. | 280/124.166 |
| 2009/0033142 | A1 * | 2/2009 | Bitz et al. | 301/127 |
| 2011/0001350 | A1 * | 1/2011 | Schmitz et al. | 301/124.1 |
| 2011/0031712 | A1 * | 2/2011 | Bitz et al. | 280/124.106 |
| 2012/0217715 | A1 * | 8/2012 | Ehrlich et al. | 280/124.128 |
| 2013/0154226 | A1 * | 6/2013 | Johnson et al. | 280/124.143 |

FOREIGN PATENT DOCUMENTS

| DE | 3338467 A1 * | 5/1985 | B60G 11/04 |
| FR | 2645802 A1 * | 10/1990 | B60G 21/055 |
| JP | 02147423 A * | 6/1990 | B60G 17/00 |

* cited by examiner

*Primary Examiner* — Paul N Dickson
*Assistant Examiner* — Laura Freedman
(74) *Attorney, Agent, or Firm* — Quinn Law Group, PLLC

(57) ABSTRACT

A torsion axle assembly for a rear suspension of a vehicle is provided. The torsion axle assembly includes a torsion axle cross beam, a first trailing arm, a second trailing arm, and a connection node component. The torsion axle cross beam has a first end and a second end. Each of the first trailing arm and the second trailing arm has a first end coupled with the vehicle frame and a second end configured to support a rear wheel of the vehicle. The connection node component is formed as a single unitary piece and is configured to couple the torsion axle cross beam, one of the first and second trailing arms, and a rear wheel hub.

19 Claims, 3 Drawing Sheets

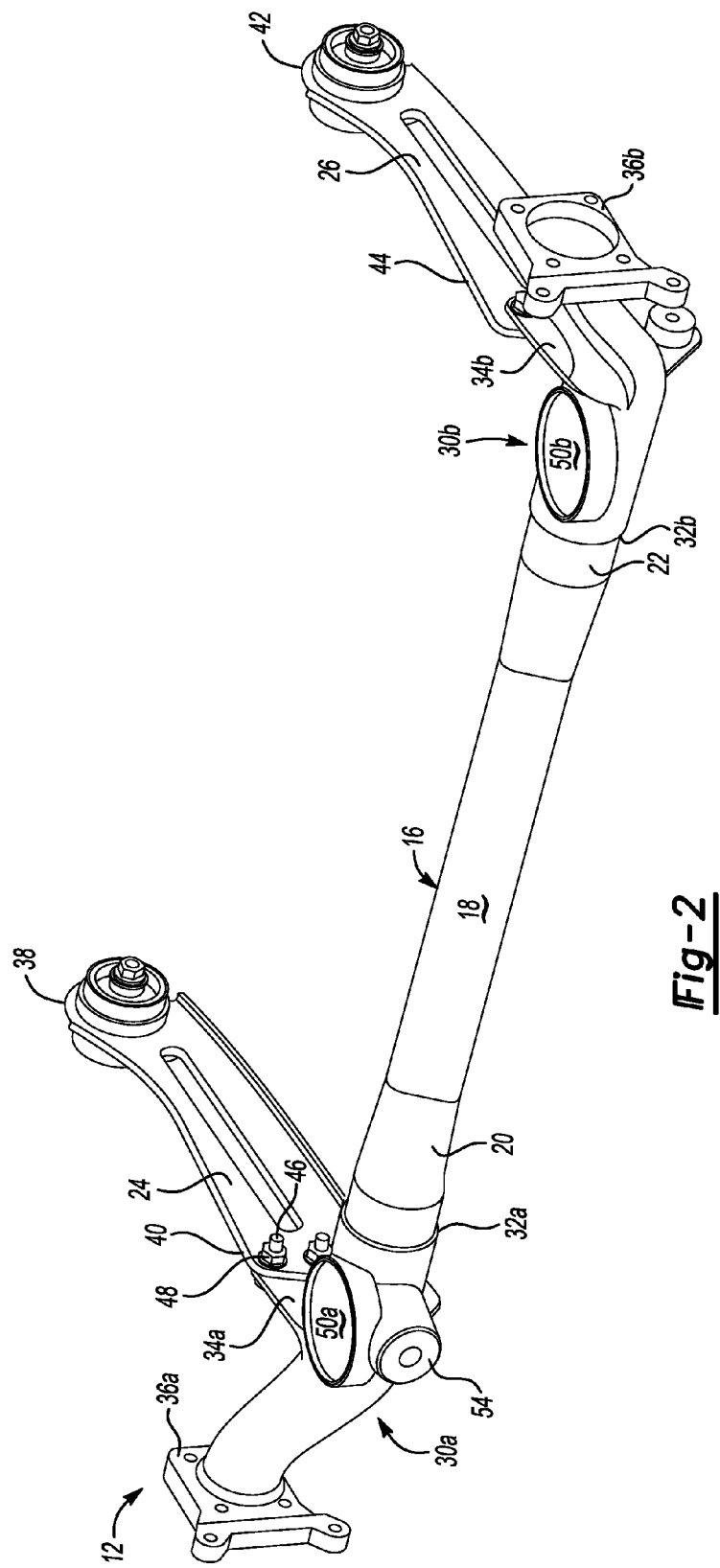

TORSION AXLE ASSEMBLY WITH CONNECTION NODE COMPONENT

TECHNICAL FIELD

The disclosure relates to a rear suspension for a vehicle having a torsion profile cross beam and a connection node component, formed as a single unitary piece, for connecting the torsion profile cross beam to other components of the rear suspension of a vehicle.

BACKGROUND

Torsion axles are commonly used in the rear suspension of front wheel drive automotive vehicles and use multiple stamped components that are welded together to create the axle structure. Many of these welded joints are in high stress or high strain areas of the axle assembly, for example, the juncture between the torsion axle and a pair of trailing arms. Such designs require very precise welds and constant fit-up over time and across vehicle make and model variations.

SUMMARY

A torsion axle assembly for a rear suspension of a vehicle is provided. The torsion axle assembly includes a torsion axle cross beam, a first trailing arm, a second trailing arm, and at least one connection node component. The torsion axle cross beam has a first end and a second end. Each of the first trailing arm and the second trailing arm has a first end coupled with the vehicle frame and a second end configured to support a rear wheel of the vehicle.

The connection node component is formed as a single unitary piece and is configured to couple the torsion axle cross beam, one of the first trailing arm and the second trailing arm, and a rear wheel hub. The at least one connection node component may be positioned at each of the torsion axle cross beam first end and the torsion axle cross beam second end. The connection node component may include a torsion axle cross beam interface, a trailing arm interface, and a rear wheel hub attachment feature. The torsion axle cross beam interface of the at least one connection node component is configured to couple the at least one connection node component and the torsion axle cross beam and may be positioned at each of the torsion axle cross beam first end and the torsion axle cross beam second end.

The trailing arm interface is configured to couple the at least one connection node component and one of the first trailing arm and the second trailing arm. The rear wheel hub attachment feature is configured to couple the connection node component and a rear wheel hub. The rear wheel hub may be configured to secure the rear wheel of the vehicle to the torsion axle assembly, via a wheel bearing.

The above features and advantages, and other features and advantages, of the present invention are readily apparent from the following detailed description of some of the best modes and other embodiments for carrying out the invention, as defined in the appended claims, when taken in connection with the accompanying drawings.

BRIEF DESCRIPTION OF THE DRAWINGS

FIG. 2 is a schematic perspective view of the torsion axle assembly;

DETAILED DESCRIPTION

Figure 1:
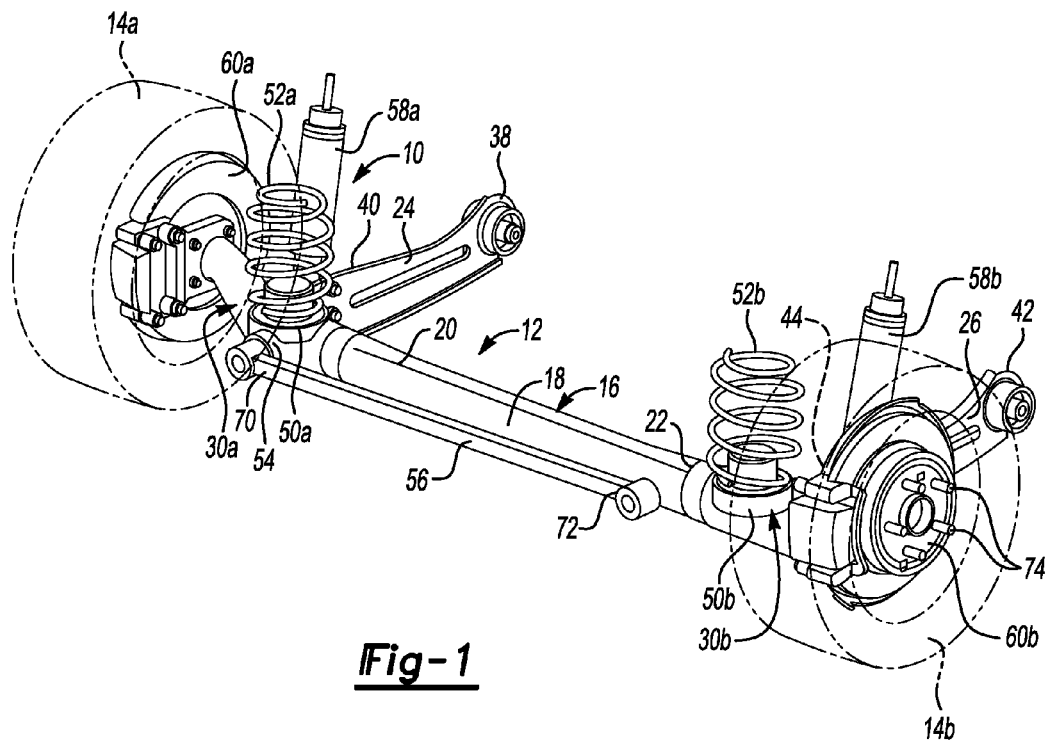
FIG. 1 is a schematic perspective view of a rear suspension incorporating a torsion axle assembly.

A torsion axle assembly 12 for use in a rear suspension 10 of a front-wheel drive automotive vehicle is provided. Referring generally to FIG. 1, the rear suspension 10 may include a torsion axle assembly 12, a track bar 56, a plurality of coils springs 52a, 52b, a plurality of dampers 58a, 58b, and a pair of rear wheel hubs 60a, 60b.

Figure 3:
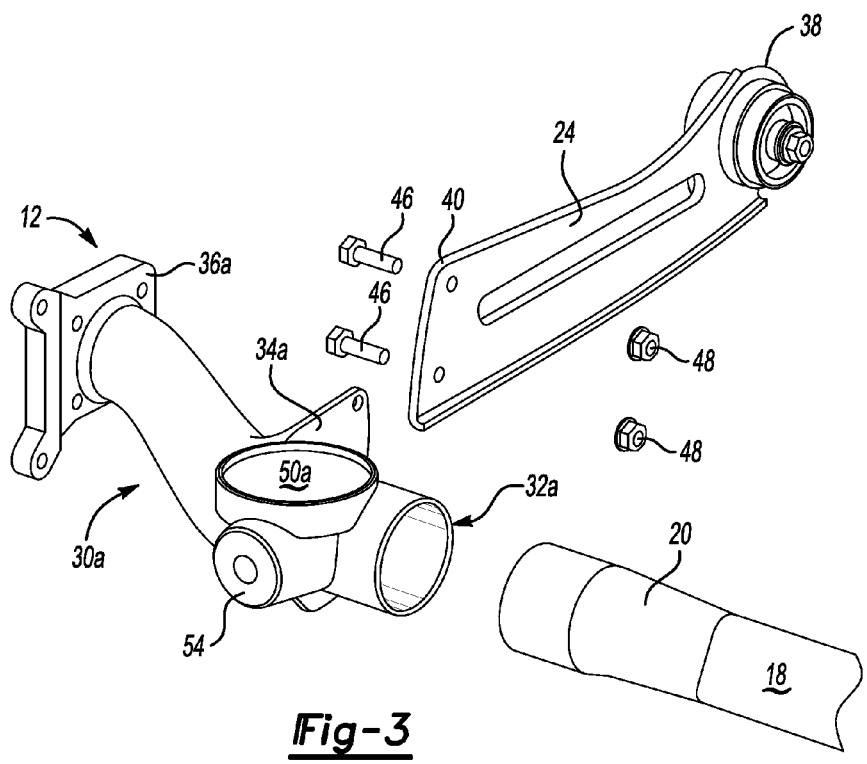
FIG. 3 is a fragmentary exploded view of a first portion of the torsion axle assembly with the torsion axle cross beam to be coupled to a connection node component in a first example coupling formation.

Referring to FIGS. 2 and 3, the torsion axle assembly 12 may include a torsion axle cross beam 18, a first trailing arm 24 and a second trialing arm 26, and at least one connection node component 30a, 30b.

The torsion axle cross beam 18 may have a first end 20 and a second end 22. The torsion axle cross beam 18 may be a torsion profile beam of adjustable geometry to accommodate several different vehicle makes and models. The torsion axle cross beam 18 may increase in diameter from the midpoint 16 between the first end 20 and second end 22 to each of the first end 20 and second end 22. This change in diameter may allow for an accommodation of different roll stiffnesses needed for variations in vehicle make and model. The torsion axle cross beam 18 may be formed of a material such as spring steel or the like.

The connection node components 30a, 30b are each formed as a single unitary piece and are configured to couple the torsion axle cross beam 18, with the first and the second trailing arms 24, 26, and rear wheels 14a, 14b of the vehicle via a rear wheel hub 60a, 60b and wheel bearing 74. The connection node components 30a, 30b may be formed by casting. The connection node components 30a, 30b may be formed of a material such as cast iron, a variation thereof, or the like. The connection node components 30a, 30b may be formed of cast nodular iron, wherein the iron material is strengthened by graphite therein in the form of nodules rather than flakes. The cast nodular iron material may also include ceramic, Magnesium, or other additives. During casting, material may be easily added or removed in the appropriate areas of the cast node component 30a, 30b, in order to adapt the component to a variety of vehicle makes and models. Casting each of the connection node components 30a, 30b as a single unitary piece eliminates additional pieces of the torsion axle assembly, which may require welding during assembly. The elimination of additional pieces contained in the torsion axle assembly 12 improves the efficiency of the assembly and validation processes, as well as eliminates fit-up, wherein fit-up is defined as the ability to align and fit or the adjustments necessary to maintain a constant gap or contact between desired components. Elimination of fit-up is beneficial when applying the design to several variations across a variety of vehicle makes and models.

The torsion axle assembly 12, may include a first connection node component 30a and a second connection node component 30b. The first connection node component 30a may be positioned at the torsion axle cross beam 18 first end 20 and the second connection node component 30b may be positioned at the torsion axle cross beam 18 second end 22.

The first connection node component 30a and the second connection node component 30b further include a torsion axle cross beam interface 32a, 32b configured to couple one of the first connection node component 30a to the first end 20 of the torsion axle cross beam 18 and the second connection node component 30b to the second end 22 of the torsion axle cross beam 18.

The torsion axle cross beam interface 32a, 32b may couple the torsion axle cross beam 18 and the at least one of the respective connection node components 30a, 30b. As shown in FIG. 2 the torsion axle cross beam 18 may be coupled to at least one of the respective connection node components 30a, 30b in a first coupling arrangement such as a weld, and more particularly a magnetic arc weld.

Figure 4:
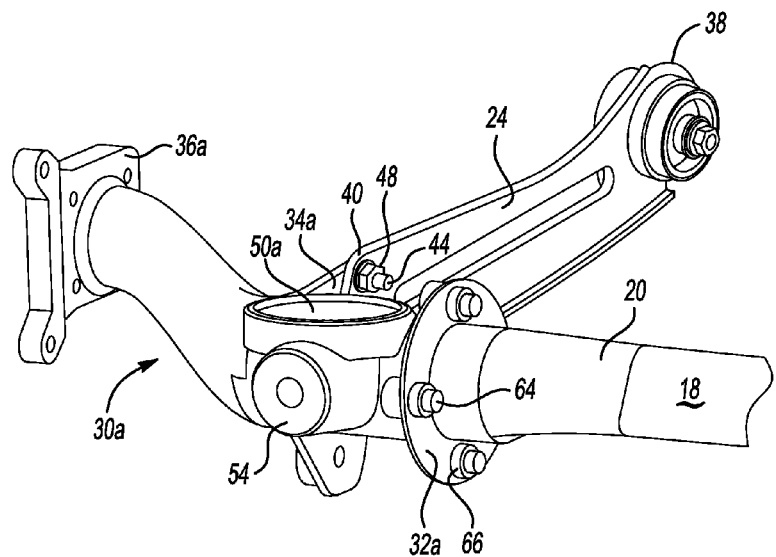
FIG. 4 is a fragmentary schematic perspective view of a first portion of the torsion axle assembly with the torsion axle cross beam coupled to a connection node component in a second example coupling formation.
Figure 5:
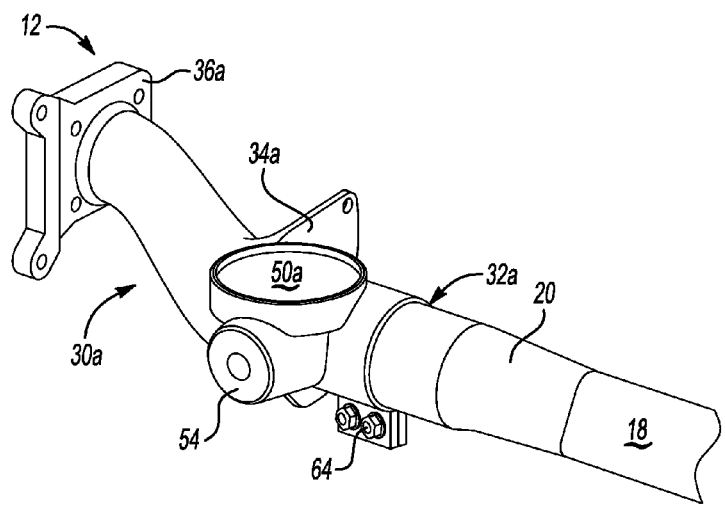
FIG. 5 is a fragmentary perspective view of a first portion of the torsion axle assembly with the torsion axle cross beam coupled to a connection node component in a third example coupling formation.

As shown in FIGS. 4 and 5, the torsion axle cross beam 18 may be coupled to the at least one of the respective connection node components 30a, 30b in a second coupling arrangement (shown in FIG. 4) or a third coupling arrangement (shown in FIG. 5) with a second plurality of retention features 64 and a second plurality of fastening features 66. The second plurality of retention features 64 may be a plurality of bolts or the like, and the second plurality of fastening features 66 may be a plurality of nuts or the like.

The second coupling arrangement, shown in FIG. 4, is a bolted attachment of the torsion axle cross beam 18 and at least one of the connection node components 30a. The third coupling arrangement, shown in FIG. 5, is a a-pinch bolt coupling arrangement of at least one of the connection node components 30a and the torsion axle cross beam 18. Each of the second coupling arrangement and the third coupling arrangement allows the torsion axle cross beam 18 to be easily rotated, and provides for different axle tuning across a variety of vehicle makes and models, while utilizing the same components. Each of the bolted coupling arrangements, shown in FIGS. 4 and 5, are also beneficial when a welding arrangement, as shown in FIG. 2, is difficult to achieve, such as when at least one of the connection node components 30a, 30b and the torsion axle cross beam 18 are composed of dissimilar or difficult to weld materials.

Referring again to FIGS. 2 and 3, the trailing arm interface 34a, 34b of each of the first connection node component 30a and the second connection node component 30b is configured to couple the respective connection node component 30a, 30b and one of the first trailing arm 24 and the second trailing arm 26.

The first trailing arm 24 has a first end 38 and a second end 40. The second trailing arm 26 has a first end 42 and a second end 44. Each of the first trailing arm 24 and second trailing arm 26 may be stamped components formed of steel or the like. Each of the first ends 38, 42 of the respective first trailing arm 24 and second trailing arm 26 are configured to be coupled to the vehicle frame (not shown). Each of the second ends 40, 44 of the respective first trailing arm 24 and the second trialing trailing arm 26 are configured to be coupled to one of the first connection node component 30a and the second connection node component 30b respectively at the trailing arm interface 34a, 34b.

The second end 40 of the first trailing arm 24 is secured to the first connection node component 30a at the first connection node component trailing arm interface 34a. The second end 44 of the second trailing arm 26 is secured to the second connection node component 30b at the second connection node component trailing arm interface 34b. Each of the first trailing arm 24 and second trailing arm 26 are secured to the respective connection node component 30a, 30b with a first plurality of retention features 46 and a first plurality of securing features 48. The first plurality of retention features 46 may be a plurality of bolts or the like, and the first plurality of fastening features 48 may be a plurality of nuts or the like. Utilizing a bolted connection at the trailing arm interface 34a, 34b via the first plurality of retention features 46 and first plurality of securing features 48 eliminates additional welds conventionally utilized to couple each of the respective trailing arms 24, 26 to the torsion axle assembly 12. The bolted connection further allows design flexibility in side-view swing arm lengths, which may vary among a variety of vehicle makes and models.

Referring to FIGS. 1-3, each of the first connection node component 30a and the second connection node component 30b may further include a rear wheel hub attachment feature 36a, 36b configured to couple a rear wheel hub 60a, 60b to one of the first connection node component 30a and second connection node component 30b. The rear wheel hubs 60a, 60b may be configured to secure each of the rear wheels 14a, 14b of the vehicle to the torsion axle assembly 12, via a wheel bearing 74.

Each of the first connection node component 30a and the second connection node component 30b may further include a spring seat 50a, 50b configured to receive the coil springs 52a, 52b (shown in FIG. 1) of the rear suspension 10 incorporating the torsion axle assembly 12. The rear suspension 10 may include a first coil spring 52a and a second coil spring 52b. The first coil spring 52a may be disposed upon the first connection node component spring seat 50a and the second coil spring 52a may be disposed upon the second connection node component spring seat 52b.

Each of the first connection node component 30a and the second connection node component 30b may further include a track bar fitting 54 configured to receive the track bar 56 of the rear suspension 10 incorporating the torsion axle assembly 12. The track bar 65 (shown in FIG. 1) may be configured to locate the torsion axle cross beam 18 laterally with respect to the vehicle frame (not shown). The track bar 56 may have a first end 70 and a second end 72. The track bar first end 70 is coupled to the first connection node component 30a at the first connection node component track bar fitting 54 and the track bar second end 72 is coupled to the vehicle frame (not shown).

The rear suspension, shown in FIG. 1, may further include a plurality of dampers 58a, 58b configured to absorb energy imparted to the rear wheels 14a, 14b of the vehicle by the terrain upon which the vehicle is driven.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A torsion axle assembly for a vehicle comprising:
  a torsion axle cross beam having a first end and a second end;
  a first trailing arm and a second trailing arm, each trailing arm having a first end and a second end, the second end of each of the respective trailing arms configured to be coupled to one of the first end and second end of the torsion axle cross beam;
  at least one connection node component including:
    a torsion axle cross beam interface configured to couple the at least one connection node component and the torsion axle cross beam;

a trailing arm interface configured to couple the at least one connection node component and one of the first trailing arm and second trailing arm;

a rear wheel hub attachment feature configured to couple the at least one connection node component to a vehicle wheel hub;

a spring seat configured to receive a coil spring; and wherein the at least one connection node component is formed as a single unitary piece and is configured to couple the torsion axle cross beam, one of the first and the second trailing arms, and the vehicle wheel hub.

2. The torsion axle assembly of claim 1 wherein the at least one connection node component comprises a first connection node component positioned at the torsion axle beam first end and a second connection node component positioned at the torsion axle cross beam second end.

3. The torsion axle assembly of claim 2, further comprising a first plurality of retention features and a first plurality of fastening features, wherein the second end of the first trailing arm is secured to the first connection node component at the first connection node component trailing arm interface and the second end of the second trailing arm is secured to the second connection node component at the second connection node component trailing arm interface with the first plurality of retention features and the first plurality of fastening features.

4. The torsion axle of claim 3, wherein the first plurality of retention features is a plurality of bolts and the first plurality of fastening features is a plurality of nuts.

5. The torsion axle assembly of claim 1, wherein the at least one connection node component further comprises a track bar fitting for receiving a track bar.

6. The torsion axle assembly of claim 1, wherein the connection node component is formed by casting.

7. The torsion axle assembly of claim 6, wherein the connection node component is formed of cast iron.

8. The torsion axle assembly of claim 6, wherein the connection node component is formed of cast nodular iron.

9. The torsion axle assembly of claim 1, wherein the torsion axle cross beam and the at least one connection node component are coupled at the torsion axle cross beam interface by a magnetic arc weld.

10. The torsion axle assembly of claim 1, further comprising a first plurality of retention features, a first plurality of fastening features, a second plurality of retention features, and a second plurality of fastening features, wherein the torsion axle cross beam and the at least one connection node component are coupled at the torsion axle cross beam interface with the second plurality of retention features and the second plurality of fastening features.

11. The torsion axle assembly of claim 10 wherein the second plurality of retention features is a plurality of bolts and the second the plurality of fastening features is a plurality of nuts.

12. A torsion axle rear suspension for an automotive vehicle having a vehicle frame, the torsion axle rear suspension comprising:

a torsion axle assembly including:
   a torsion axle cross beam having a first end and a second end;
   a first trailing arm and a second trailing arm coupled to the torsion axle cross beam at each of the first end and second end, each trailing arm having a first end and a second end, the second end of each of the respective trailing arms configured to be coupled to one of the first end and the second end of the torsion axle cross beam;
   at least one connection node component including:
      a torsion axle cross beam interface configured to couple the at least one connection node component and the torsion axle cross beam;
      a trailing arm interface configured to couple the at least one connection node component and one of the first trailing arm and second trailing arm;
      rear wheel hub attachment feature configured to couple the at least one connection node component and a rear wheel hub;
      a spring seat configured to receive a coil spring;
      a track bar fitting for receiving a track bar;
      wherein the track bar has a first end and a second end, the track bar first end configured to be coupled to the torsion axle assembly at the track bar fitting of the at least one connection node component; and
      wherein the at least one connection node component is formed as a single unitary piece and is configured to couple the torsion axle cross beam, one of the first and second trailing arms, and the rear wheel hub of the vehicle.

13. The torsion axle rear suspension of claim 12, wherein the at least one connection node component comprises a first connection node component positioned at the torsion axle beam first end and a second connection node component positioned at the torsion axle cross beam second end.

14. The torsion axle rear suspension of claim 13, wherein the second end of the first trailing arm is bolted to the first connection node component at the second connection node component trailing arm interface and the second end of the second trailing arm is bolted to the second connection node component at the second connection node component trailing arm interface.

15. The torsion axle rear suspension of claim 13, wherein the track bar first end is coupled to the first connection node component at the first connection node component track bar fitting and the track bar second end is coupled to the vehicle frame.

16. The torsion axle rear suspension of claim 13, further comprising a first coil spring and a second coil spring, the first coil spring disposed upon the first connection node component spring seat and the second coil spring disposed upon the second connection node component spring seat.

17. The torsion axle rear suspension of claim 12, wherein the at least one connection node component is formed by casting.

18. The torsion axle rear suspension of claim 12, wherein the at least one connection node component is from of nodular cast iron.

19. The torsion axle rear suspension of claim 12, wherein the torsion axle cross beam is formed of spring steel.

* * * * *